UNITED STATES PATENT OFFICE.

RUDOLF BERENDES, OF ELBERFELD, GERMANY, ASSIGNOR TO FARBENFABRIKEN OF ELBERFELD CO., OF NEW YORK, N. Y., A CORPORATION OF NEW YORK.

ALKALINE SALTS OF METHYLENE CITRIC ACID AND PROCESS OF MAKING SAME.

SPECIFICATION forming part of Letters Patent No. 715,239, dated December 9, 1902.

Application filed September 4, 1902. Serial No. 122,113. (No specimens.)

*To all whom it may concern:*

Be it known that I, RUDOLF BERENDES, doctor of philosophy, chemist, residing at Elberfeld, Germany, (assignor to the FARBENFABRIKEN OF ELBERFELD COMPANY, of New York,) have invented a new and useful Improvement in Alkaline Salts of Methylene Citric Acid and Process of Making Same; and I do hereby declare the following to be an exact and clear description of my invention.

This invention relates to the manufacture of the hitherto unknown alkaline salts of methylene citric acid.

My new process consists in first treating methylene citric acid with alkalies—such as NaOH, KOH, $NH_3$, $Na_2CO_3$, $KHCO_3$, or the like—and then precipitating the resulting alkaline salts by means of alcohol. It was not to be expected that the alkaline salts of methylene citric acid could be prepared on account of the great liability of this compound to decomposition by the action of alkalies, as is stated in the United States Letters Patent No. 699,422, dated May 6, 1902, on lines 34 and 35.

The alkaline salts of methylene citric acid obtainable by my new process are white crystalline compounds readily soluble in water. On heating their watery solutions they are decomposed, formic aldehyde being split off. They are the first known readily-soluble compounds of neutral reaction which are capable of splitting off formic aldehyde, being therefore valuable remedies for internal therapeutics—*e. g.*, for the disinfection of the urinary passages or the like.

In carrying out my process practically I can proceed as follows, the parts being by weight: Eight parts of sodium hydroxid are dissolved in twenty parts of water, and twenty-one parts of methylene citric acid are introduced into the resulting solution while cooling the mixture. The solution thus obtained is then stirred into twenty parts of alcohol. After a short time the neutral sodium salt of methylene citric acid is precipitated. It is filtered off, washed with alcohol, and dried at about 30° centigrade.

The neutral sodium salt of methylene citric acid forms white needles containing four molecules of water. It is readily soluble in water, soluble with difficulty in alcohol, and insoluble in ether and benzene. It is a valuable remedy, an average dose being from one and one-half to three grams.

The process proceeds in an analogous manner for the preparation of the other alkaline salts.

Having now described my invention and in what manner the same is to be performed, what I claim as new, and desire to secure by Letters Patent, is—

1. The herein-described process for preparing neutral alkaline salts of methylene citric acid, which process consists in first treating methylene citric acid with alkalies and then precipitating the resulting alkaline salts by means of alcohol, substantially as described.

2. The herein-described process for preparing the neutral sodium salt of methylene citric acid, which process consists in first treating methylene citric acid with sodium hydroxid and then precipitating the resulting sodium salt by means of alcohol, substantially as described.

3. The herein-described new neutral alkaline salts of methylene citric acid, being white crystalline compounds readily soluble in water, which solutions when heated are decomposed, formic aldehyde being split off, substantially as described.

4. The herein-described neutral sodium salt of methylene citric acid, forming white needles containing four molecules of water readily soluble in water, soluble with difficulty in alcohol and being insoluble in benzene and ether, substantially as described.

In testimony whereof I have signed my name in the presence of two subscribing witnesses.

RUDOLF BERENDES.

Witnesses:
OTTO KÖNIG,
J. A. RITTERSHAUS.